US008828347B2

(12) United States Patent
Ishii

(10) Patent No.: US 8,828,347 B2
(45) Date of Patent: Sep. 9, 2014

(54) METHOD AND APPARATUS FOR GASIFICATION WITH $CO_2$ RECOVERY

(75) Inventor: Toru Ishii, Tokyo (JP)

(73) Assignee: IHI Corporation, Tokyo (JP)

(*) Notice: Subject to any disclaimer, the term of this patent is extended or adjusted under 35 U.S.C. 154(b) by 1167 days.

(21) Appl. No.: 12/740,937

(22) PCT Filed: Nov. 12, 2008

(86) PCT No.: PCT/JP2008/003275
§ 371 (c)(1),
(2), (4) Date: Apr. 30, 2010

(87) PCT Pub. No.: WO2009/063623
PCT Pub. Date: May 22, 2009

(65) Prior Publication Data
US 2010/0266477 A1 Oct. 21, 2010

(30) Foreign Application Priority Data

Nov. 14, 2007 (JP) .................................. 2007-295158
Nov. 11, 2008 (JP) .................................. 2008-288397

(51) Int. Cl.
*C01B 31/20* (2006.01)
*C10J 3/00* (2006.01)

(52) U.S. Cl.
USPC ........ 423/437.1; 48/197 R; 252/373; 423/438

(58) Field of Classification Search
USPC ........ 423/438, 437.1, 644; 252/373; 422/162; 48/197 R, 61
See application file for complete search history.

(56) References Cited

U.S. PATENT DOCUMENTS 3,516,808 A * 6/1970 Everett et al. ............... 48/197 R
4,069,304 A 1/1978 Starkovich et al.

(Continued)

FOREIGN PATENT DOCUMENTS

JP 2001-19402 1/2001
JP 2002-53876 2/2002

(Continued)

OTHER PUBLICATIONS

S. Y. Lin, et al., "Reaction and Fluidization of Coal/CaO Mixture with Steam under High Pressure (HyPr-RING method)", National Institute of Advanced Industrial Science and Technology, 2004, pp. 137-144.

(Continued)

*Primary Examiner* — Stanley Silverman
*Assistant Examiner* — Syed Iqbal
(74) *Attorney, Agent, or Firm* — Oblon, Spivak, McClelland, Maier & Neustadt, L.L.P.

(57) ABSTRACT

Gasification of carbon-containing raw material into gasified gas and recovery of $CO_2$ are enabled at the same pressure throughout a system.
Provided are a hydration tower 1 for performing hydration reaction by contact of CaO with water vapor while keeping at a predetermined pressure and a temperature at or below an upper limit for production of $Ca(OH)_2$; a gasification reactor 2 with a water removal section 2a for dehydration of $Ca(OH)_2$ introduced through heating to obtain highly active CaO and with a gasification section 2b for production of char through reaction of a raw material with water vapor and production of gasified gas through gasification of the char, $CO_2$ being absorbed by CaO from the section 2a to produce $CaCO_3$, heat of reaction at that time being used for the gasification of the raw material, the gasified gas being used as a heat source for the dehydration in the section 2a; and an absorbent regeneration tower 3 in which, in the presence of the char-containing $CaCO_3$ from the section 2b, $CO_2$, water vapor and oxygen, $CaCO_3$ is calcined with heat of combustion of the char to separate it into $CO_2$ and CaO, the resultant CaO being supplied to the hydration tower 1. The pressure in the reactor 2 and in the tower 3 connected to the tower 1 is the same as pressure in the tower 1.

12 Claims, 5 Drawing Sheets

(56) References Cited

U.S. PATENT DOCUMENTS

| | | | |
|---|---|---|---|
| 5,232,793 A * | 8/1993 | Miyauchi et al. | 429/410 |
| 6,790,430 B1 | 9/2004 | Lackner et al. | |
| 2003/0029088 A1 | 2/2003 | Lyon | |
| 2004/0060237 A1 * | 4/2004 | Cole | 48/77 |
| 2007/0032380 A1 | 2/2007 | Anthony et al. | |
| 2009/0126271 A1 | 5/2009 | Kyo et al. | |

FOREIGN PATENT DOCUMENTS

| | | |
|---|---|---|
| JP | 2003-82361 | 3/2003 |
| JP | 2007-23214 | 2/2007 |
| WO | 00/27951 | 5/2000 |
| WO | WO 01/04045 A1 | 1/2001 |
| WO | WO 2005/046862 A1 | 5/2005 |

OTHER PUBLICATIONS

Shiying Lin, et al., Process Analysis for Hydrogen Production by Reaction-Integrated Novel Gasification (HyPr-RING), Japan Coal Energy Center, National Institute of Advanced Industrial Science and Technology, 2005, pp. 280-281.

Eiji Sasaoka, et al., "Preparation of Porous Lime from Natural Lime by Swelling Method with Water Vapor for High-Temperature Desulfurization", Dai 35 Kai Papers form the Coal Science Symposia, 1998, pp. 377-380.

Extended European Search Report issued Apr. 26, 2012, in European Patent Application No. 08850183.8.

* cited by examiner

METHOD AND APPARATUS FOR GASIFICATION WITH $CO_2$ RECOVERY

TECHNICAL FIELD

The present invention relates to a method and an apparatus for gasification with $CO_2$ recovery adapted to gasify a carbon-containing raw material such as coal or biomass to produce a gasified gas while $CO_2$ is recovered, at the same pressure throughout a system.

BACKGROUND ART

Various methods have been proposed for production of hydrogen $H_2$ on an industrial scale. In a natural gas reformation method using natural gas as raw material, $H_2$ is obtained by reforming the natural gas with water vapor, in the presence of a catalyst, into hydrogen $H_2$ and carbon monoxide CO and converting the resultant CO, through a water gas shift reaction, into $H_2$ with carbon dioxide $CO_2$ as by-product which in turn is removed. In order to obtain heat required for the reformation reaction which is endothermic, a small amount of oxidizer (oxygen or air) is added for combustion of a portion of the natural gas to thereby obtain heat required.

The above-mentioned natural gas reformation method uses expensive natural gas as raw material. In addition, securement of the raw material itself is becoming difficult in a current situation where demand for natural gas is progressively increasing. Furthermore, production of $CO_2$ as by-product in the reformation process is undesirable from a viewpoint of reduction of greenhouse gas discharge. Such discharge of the by-product $CO_2$ may be suppressed by adding a device for recovery of the by-product $CO_2$, which is however problematic in that not only the raw material itself is expensive but also processing cost is increased for concentrating and removing of $CO_2$, inevitably resulting in elevation in price of hydrogen as end product.

A gasification method using coal or heavy oil as raw material is fundamentally similar to the natural gas reformation method. Coal or heavy oil is reacted with water vapor in the presence of a small amount of oxidizer into $H_2$ and CO, the resultant CO being converted into $H_2$ and $CO_2$ by the water gas shift reaction.

With this gasification method, coal or heavy oil as raw material is cheaper than natural gas. However, it is problematic in that not only proportion of carbon C in elemental composition of the raw material is greater than that of natural gas, but also high temperature (1000° C.-1500° C., depending on reaction method) is required for the reaction, so that burned proportion of the raw material becomes greater and thus a discharged amount of $CO_2$ becomes greater.

In order to overcome this, a $CO_2$ recovery type gasification system called HyPr-RING process has been recently proposed an example of which is disclosed in Patent Literature 1.

In the $CO_2$ recovery type gasification line, $H_2$ is obtained by reacting a carbon-containing raw material such as coal or biomass with water vapor $H_2O$ in the presence of calcium oxide CaO as $CO_2$ absorbent. $CO_2$ produced during the reaction is fixed as calcium carbonate $CaCO_3$ (absorptive-reaction product) by the co-existing CaO and further CO is converted into $CO_2$ and $H_2$ by the water gas shift reaction, so that $H_2$ becomes prevailing in the gasified gas produced. $CH_4$ and other hydrocarbons are also produced and contained without change in the gasified gas since they do not react with CaO. $CH_4$ produced is in an amount around 10% to 20% of that of $H_2$, the other gas components being in extremely small amounts.

The absorptive-reaction product $CaCO_3$ fixed through absorption of $CO_2$ is burned at high temperature for separation of $CO_2$ (this is termed as "calcination"), CaO obtained by the $CO_2$ separation being reused. Such calcination performed in the mixed gas of $CO_2$ with oxygen $O_2$ brings about highly concentrated $CO_2$ and therefore facilitates recovery and isolation of $CO_2$.

[Patent Literature 1] JP 2003-82361A

SUMMARY OF INVENTION

Technical Problems

As mentioned in the above, the gasification reaction of the raw material with water vapor, which is endothermic, requires some heat source. Patent Literature 1, in which heat is produced by reaction of CaO co-existing in the gasification process with the water vapor and the resultant $CO_2$ in the gasification reaction, is characteristic in that this heat produced is utilized for gasification of the raw material. However, at a temperature as high as 600° C. or more which is the required condition for gasification, the reaction of CaO with $H_2O$ is restrictive; for example, the reaction does not proceed at all at atmospheric pressure (0.1 MPa in term of absolute pressure). In Patent Literature 1 with gasification being performed at around 650° C., the reaction of CaO with water under this condition requires water vapor partial pressure of 1.0 MPa or more (preferably 1.5 MPa, in terms of absolute pressure). Thus, in consideration of gas composition produced by the gasification reaction, total pressure required is, say, 3.0 MPa; yet higher pressure may be required depending on mixed proportions of water vapor with the other produced gas components.

On the other hand, the reaction of CaO with $CO_2$ may proceed even at low pressure; however, it is problematic in that repeated operations of calcining CaO having directly absorbed $CO_2$ may bring about abrupt lowering in activity of CaO. This is considered due to the fact that direct reaction of CaO with $CO_2$ causes resultant $CaCO_3$ to have an extremely compact surface and that the calcination in this state also causes resulting CaO to have also an extremely compact surface, resulting in lowering of reactivity. This inhibits the reaction of CaO with the raw-material gas, leading to abrupt lowering of activity.

It was found out that reacting CaO with water vapor for production of $Ca(OH)_2$ as hydrate before reaction of CaO with $CO_2$ has an effect of returning the compact surface of CaO into the surface with high activity. On the basis of this finding, it was considered appropriate in the $CO_2$ recovery type gasification system in Patent Literature 1 to provide a pressure condition as high as around 3.0 MPa (absolute pressure) which allows reaction of CaO with water vapor even under the temperature condition as high as 650° C.

In Patent Literature 1 where a large amount of CaO is used for absorption of $CO_2$, it is a prerequisite to regenerate and reuse CaO after use. The absorptive-reaction product $CaCO_3$ produced through absorption of $CO_2$ is calcined at high temperature to be returned into CaO with emission of $CO_2$, the calcination of $CaCO_3$ being normally performed in the air. In Patent Literature 1 characteristic in recovery of $CO_2$, $CO_2$ must be obtained at high concentration, so that the calcination must be performed in a $CO_2$/oxygen atmosphere. When $CO_2$ concentration is low, $CaCO_3$ may be decomposed even at 900° C. or less; it requires, however, a temperature of more than 1000° C. even at an atmospheric pressure when $CO_2$ exists in a concentration close to 100%. It was found out that in a high pressure of 3.0 MPa just like that for the gasification, the conditions are even more severe and $CaCO_3$ is not decomposed even at a temperature far above 1000° C.

Thus, calcination of the absorptive-reaction product $CaCO_3$ is difficult to perform at 3.0 MPa; it is required to reduce the pressure into atmospheric pressure and add a slight amount of diluent gas (water vapor is referable in consideration of $CO_2$ recovery). Thus, in the conventional $CO_2$ recovery type gasification system, the gasification and the calcination must be performed at high pressure and at atmospheric pressure, respectively; as a result, the $CO_2$ absorbent (CaO) must be circulated therebetween through pressure elevation and reduction devices.

Used as the pressure elevation and reduction devices is a mechanism comprising a plurality of vessels called lock hoppers, valves between the vessels, a gas supply line for pressure elevation and a gas release line. Because of high pressures, such mechanism is extremely complicated in structure and high in price; the valves between the vessels have restriction in temperature used; and moreover a cooler for powdery material is newly needed since powdery material is required to be cooled to a certain extent. Thus, the apparatus becomes yet more complicated in structure and becomes extremely demanding both from the technical viewpoint and from the aspect of cost.

Further, as described above, gasification and calcination zones with great pressure difference as high as 3.0 MPa are partitioned by the lock hoppers or the like, so that the gas tends to partly leak through the valves. Thus, disadvantageously, frequent maintenance of the valves is required; a protective device is required for ensuring safety even if the leaked amount is increased during the operation; a great gas-compression power is required for raising lock-hopper pressure; and such gas-compression power required is further increased as the leaked amount increases.

The invention was made in view of the above and has its object to provide a method and an apparatus for gasification with $CO_2$ recovery adapted to gasify a carbon-containing raw material such as coal or biomass to produce a gasified gas while $CO_2$ is recovered, at the same pressure throughout a system.

Solution to Problems

The invention is directed to a method for gasification with $CO_2$ recovery, characterized by comprising:

a hydration process for performing a hydration reaction by contact of a $CO_2$ absorbent with water vapor while keeping a predetermined pressure and maintaining a temperature at or below an upper limit for production of an absorbent hydrate;

a water removal process in which the absorbent hydrate produced by the hydration process is introduced to be heated for water removal, thereby obtaining a highly active absorbent;

a gasification process for producing char through reaction of a raw material with water vapor and for gasifying the char to produce a gasified gas, $CO_2$ being absorbed by said highly active absorbent from said water removal process to produce an absorptive-reaction product, heat of the reaction at this time being utilized for gasification of said raw material, said gasified gas being passed through said water removal process for supply of a heat source for water removal from the absorbent hydrate;

an absorbent regeneration process in which, in the presence of the absorptive-reaction product including the char from said gasification process, a circulation gas including $CO_2$ and water vapor and oxygen, the absorptive-reaction product is calcined with heat of combustion of the char for separation into $CO_2$ and $CO_2$ absorbent, a resultant $CO_2$ absorbent being supplied to said hydration process; and a $CO_2$ recovery process for extracting and recovering a portion of $CO_2$ separated by said absorbent regeneration process and circulated to said gasification process and to said absorbent regeneration process;

pressure in said water removal process, said gasification process and said absorbent regeneration process being the same as pressure in said hydration process.

It is preferable in the method for gasification with $CO_2$ recovery as described above that an absolute total pressure is set to a desired pressure within a range of 0.1 MPa-1.0 MPa by controlling, among the respective processes, water vapor partial pressure in a hydration tower, water vapor partial pressure in said gasification process and $CO_2$ partial pressure in an absorbent regeneration tower to ranges suitable for corresponding reactions while adjusting a gas composition for each of the corresponding processes.

It is preferable in the method for gasification with $CO_2$ recovery as described above that said hydration process has a temperature of 450° C.-550° C.

It is preferable in the method for gasification with $CO_2$ recovery as described above that said water removal and gasification processes have a temperature of 600° C.-700° C.

It is preferable in the method for gasification with $CO_2$ recovery as described above that said absorbent regeneration process has temperature of 900° C.-1000° C.

The invention is directed to an apparatus for gasification with $CO_2$ recovery, characterized by comprising:

a hydration tower for performing a hydration reaction by contact of a $CO_2$ absorbent with water vapor while keeping a predetermined pressure and maintaining a temperature at or below an upper limit for production of an absorbent hydrate;

a gasification reactor comprising a water removal section in which the absorbent hydrate produced in the hydration tower is introduced to be heated for water removal, thereby obtaining a highly active absorbent, and a gasification section for producing char through reaction of a raw material with water vapor and for gasifying the char to produce a gasified gas, $CO_2$ being absorbed by said highly active absorbent from said water removal process to produce an absorptive-reaction product, heat of the reaction at this time being utilized for gasification of said raw material, said gasified gas being passed through said water removal process for supply of a heat source for water removal from the absorbent hydrate;

a gas-flow transfer unit for transferring the absorptive-reaction product including the char from the gasification section of the gasification reactor to upward;

an absorbent regeneration tower in which, in the presence of the absorptive-reaction product including the char transferred by the gas-flow transfer unit, a circulation gas including $CO_2$ and water vapor and oxygen, the absorptive-reaction product is calcined with heat of combustion of the char for separation into $CO_2$ and $CO_2$ absorbent, a resultant $CO_2$ absorbent being supplied to said hydration tower; and a $CO_2$ recovery line for extracting and recovering a portion of $CO_2$ separated by an absorbent regeneration process and circulated to a gasification process and to an absorbent regeneration process;

pressure in said gasification reactor and absorbent regeneration tower connected to said hydration tower being the same as pressure in said hydration tower.

It is preferable in the apparatus for gasification with $CO_2$ recovery as described above that said absorbent regeneration tower comprises an upper chamber which receives the absorptive-reaction product including char by gravity feed from said gasification section of said gasification reactor and which principally performs a calcination reaction of the absorptive-reaction product for separation of the same into $CO_2$ and $CO_2$ absorbent, and a lower chamber which receives the $CO_2$ absorbent and the char from said upper chamber and which principally performs combustion of the char.

It is preferable in the apparatus for gasification with $CO_2$ recovery as described above that said absorbent regeneration tower comprises an upper preheating chamber which receives the absorptive-reaction product including char by gravity feed from said gasification section of said gasification reactor to preheat said absorptive-reaction product; an intermediate reaction chamber which receives the absorptive-reaction product including the char from said preheating chamber and which performs a calcination reaction of said absorptive-reaction product for separation of the same into $CO_2$ and $CO_2$ absorbent by heat of combustion of the char; and a lower heat exchange chamber which receives the $CO_2$ absorbent from said reaction chamber and which heats a circulation gas by contact with said $CO_2$ absorbent; and further comprises transfer means which receives in a transfer pot $CO_2$ absorbent from said heat exchange chamber, transfers the $CO_2$ absorbent with the circulation gas to a solid separation pot at a highest position and supplies the $CO_2$ absorbent separated in said solid separation pot to said hydration tower by gravity feed.

It is preferable in the apparatus for gasification with $CO_2$ recovery as described above that said absorbent regeneration tower comprises a blowing-up regeneration tower which receives at a lower end thereof the absorptive-reaction product including char from said gasification section of said gasification reactor by gravity feed, said absorptive-reaction product being subjected to said calcination reaction by heat of combustion of the char and being separated into $CO_2$ and $CO_2$ absorbent while being blown up in an interior of the tower by the circulation gas, said blowing-up regeneration tower being connected at an upper end thereof to a solid separation pot with distribution means which is adapted to supply a portion of the $CO_2$ absorbent separated by said solid separation pot to said hydration tower by gravity feed and to circulate the remainder of said $CO_2$ absorbent to the lower end of said blowing-up regeneration tower.

Advantageous Effects of Invention

According to a method and an apparatus for gasification with $CO_2$ recovery of the invention, in which a hydration tower, a gasification reactor and an absorbent regeneration tower can be kept at the same pressure, the following excellent effects and advantages can be obtained. The apparatus can be substantially simplified in structure since pressure elevation and lowering devices can be omitted which are provided for transfer of $CO_2$ absorbent and the like between the gasification reactor and absorbent regeneration tower maintained in the prior art at different pressures. An efficient continuous operation can be made at the same pressure. Handling and control of the apparatus become simplified since the operation is performed at a low pressure close to the atmospheric pressure.

Figure 1:
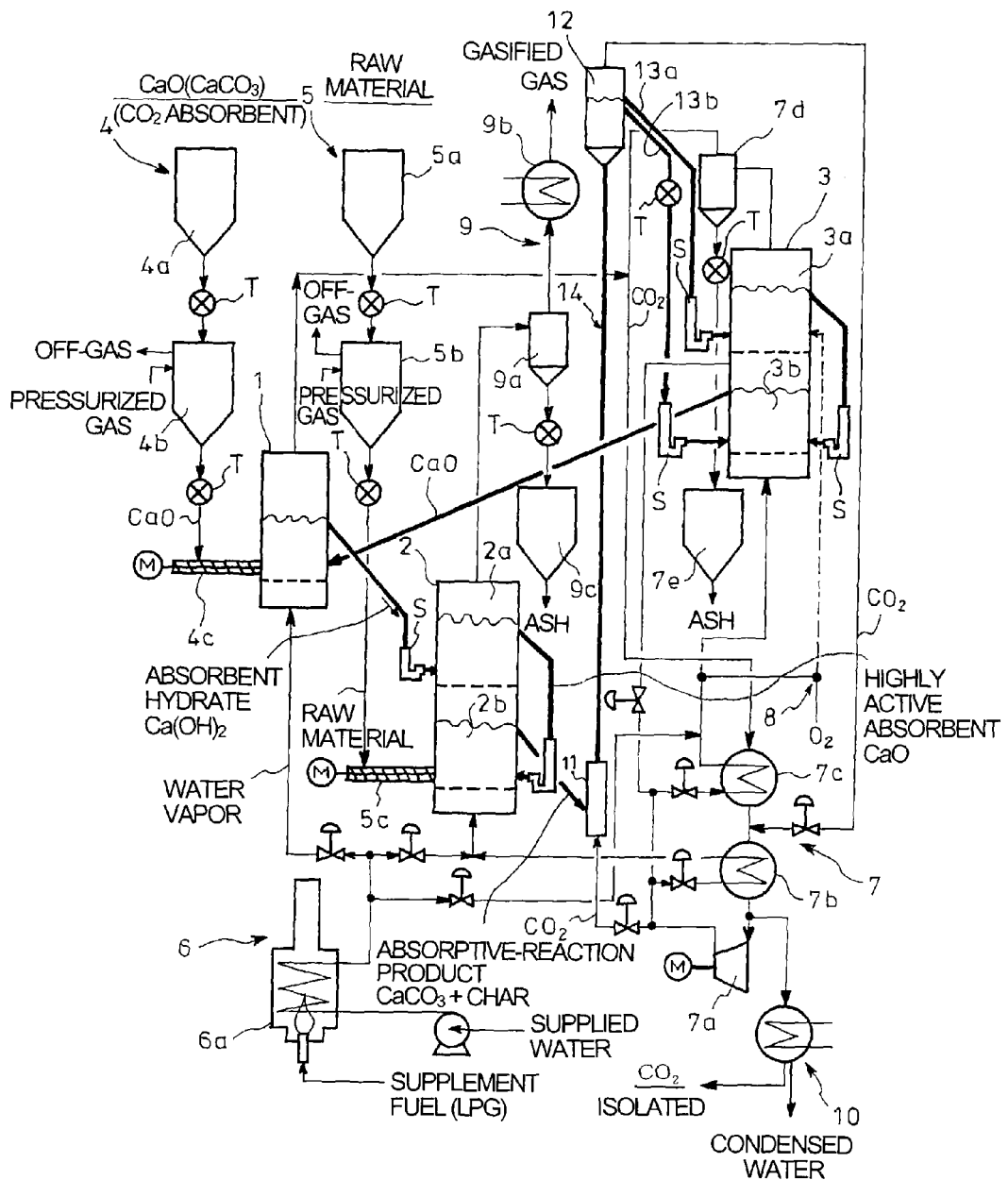
FIG. 1 is a flow sheet showing an embodiment of an apparatus for gasification according to the invention.

REFERENCE SIGNS LIST 1 hydration tower
2 gasification reactor
2a water removal section
2b gasification section
3 absorbent regeneration tower
3' absorbent regeneration tower
3" absorbent regeneration tower
3a upper chamber
3b lower chamber
3c preheating chamber
3d reaction chamber
3e heat exchange chamber
3f blowing-up regeneration tower
4 absorbent supply line
5 raw material supply line
6 water vapor supply line
7 circulation gas supply line
8 oxygen supply line
9 gasified gas extraction line
10 $CO_2$ recovery line
15 transfer means
16 transfer pot
17 solid separation pot
18 solid separation pot
19 distribution means

DESCRIPTION OF EMBODIMENTS

Embodiments of the invention will be described with reference to the appended drawings.

FIG. 1 is a flow sheet showing an embodiment of an apparatus for gasification according to the invention. In the figure, reference numeral 1 denotes a hydration tower; 2, a gasification reactor; 3, an absorbent regeneration tower; 4, a $CO_2$ absorbent supply line for supplying calcium oxide CaO as $CO_2$ absorbent to the hydration tower 1; 5, a raw material supply line for supplying a carbon-containing raw material such as coal or biomass to be gasified to the gasification reactor 2; 6, a water vapor supply line for supplying water vapor to the hydration tower 1, gasification reactor 2 and absorbent regeneration tower 3; 7, a circulation gas supply line for supplying a $CO_2$- and water-vapor-prevailing circulation gas from the absorbent regeneration tower 3 to the gasification reactor 2 and to the absorbent regeneration tower 3; 8, an oxygen supply line for supplying oxygen $O_2$ to the absorbent regeneration tower 3; 9, a gasified gas extraction line for extracting hydrogen-prevailing gasified gas produced in the gasification reactor 2; and 10, a $CO_2$ recovery line for extracting a portion of the circulation gas from the circulation gas supply line 7 to condense and remove the water vapor therefrom for recovery of $CO_2$.

As shown in FIG. 1, in the hydration tower 1 arranged before the gasification reactor 2, CaO as $CO_2$ absorbent is reacted with water vapor to produce absorbent hydrate $Ca(OH)_2$ which is supplied to the gasification reactor 2. Introduced into the hydration tower 1 is CaO (actually, limestone:

CaCO$_3$) supplied as supplement from the CO$_2$ absorbent supply line 4 and CaO calcined from the absorbent regeneration tower 3 as will be described hereinafter whereas the water vapor is supplied, through a bottom of the hydration tower for formation of a fluidized bed, from the water vapor supply line 6 including a water vapor generation furnace 6a such as an auxiliary boiler. In accordance with Equation 1 of hydration shown below, such CaO is reacted with the water vapor to produce Ca(OH)$_2$.

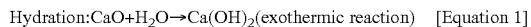

Hydration:CaO+H$_2$O→Ca(OH)$_2$(exothermic reaction)  [Equation 1]

Ca(OH)$_2$ thus produced through absorption of the water vapor by CaO is in a state of having its reactivity preserved due to its loose surface crystalline structure, which was ascertained experimentally. Ca(OH)$_2$ produced in the hydration tower 1 is supplied by overflow to the gasification reactor 2.

The CO$_2$ absorbent used may be obtained through calcination and decomposition of limestone CaCO$_3$, which is easily available industrially, into calcium oxide CaO. When a raw material such as coal having a high ash percentage is gasified, the ash gradually admixes into the CO$_2$ absorbent during circulated use of the CO$_2$ absorbent, and the CO$_2$ absorbent with an ash percentage over a certain level may be deteriorated in CO$_2$ absorption capability because of lowering of CaO concentration; in order to overcome this, some of the circulated CaO is extracted and CaCO$_3$ in an amount matching thereto is supplied for compensation by the CO$_2$ absorbent supply line 4. In the apparatus shown in FIG. 1, CaCO$_3$ is supplied from an upper vessel 4a to a lower vessel 4b with a valve T at an outlet of the lower vessel 4b being closed; then, a valve T at an outlet of the upper vessel 4a is closed and the lower vessel 4b is pressurized. Further, the valve T at the outlet of the lower vessel 4b is opened and, in the state of the given pressure being maintained, a required amount of CaCO$_3$ is supplied to the hydration tower 1 using, for example, a screw feeder 4c. If the apparatus is large-scale, a further vessel may be often provided below the lower vessel 4b to thereby provide the three-stage line, the functions of pressurizing the vessel 4b and of volumetric feeding to the screw feeder 4c being allotted to the two vessels, respectively. In FIG. 1, CaCO$_3$ is supplied to the hydration tower 1; alternatively, CaCO$_3$ may be first supplied to the absorbent regeneration tower 3 for calcination thereof before it is supplied to the hydration tower 1 and to the gasification reactor 2 since CaCO$_3$ has no CO$_2$ absorption capability. When a raw material having a low ash percentage is gasified, it is not necessary to extract some of the circulated CaO so as to prevent elevation of the ash percentage; however, the circulated CaO may be reduced in amount since some of fine-grained circulated CaO may be removed by, for example, a dust collector 9a comprising a cyclone or the like, so that the CO$_2$ absorbent supply line 4 can be used for this supplementation.

As described above, Ca(OH)$_2$ obtained in the hydration tower 1 through the reaction of CaO with the water vapor can be used for absorption of CO$_2$ to thereby prevent lowering of reactivity due to the repeated use of the CO$_2$ absorbent; in order to realize the reaction of CaO with the water vapor before the CO$_2$ absorption, high pressure condition is required. However, attention was paid to the fact that CaO may be reacted with water vapor to produce Ca(OH)$_2$ even at low pressure, provided that it is under low temperature condition; and experiments were performed to select a temperature that is less than an upper limit for production of Ca(OH)$_2$ by contact of CaO with water vapor (i.e. a temperature lower than a temperature of an equilibrium curve). As a result, it was obtained that when the temperature condition is relaxed, for example, to 500° C., CaO may be reacted with water vapor even at 0.4 MPa (absolute pressure).

Thus, the hydration conditions of the hydration tower 1 are set as follows:
Temperature: 500° C.±50° C.
Pressure: 0.4 MPa±0.1 MPa (absolute pressure)
Water vapor supplied: around twice a CaO-equivalent Here, the CaO-equivalent is a number of moles of water vapor (H$_2$O) necessary for reaction of all of CaO in a CO$_2$ absorbent circulated (i.e., inflow amount per unit time) into Ca(OH)$_2$.

In the above, that the water vapor supplied is set to around twice the CaO-equivalent is such that half of the supplied water vapor is actually used for the reaction while the other half is added as extra for ensuring smooth procession of the reaction.

If the conditions of the hydration tower 1 are set as mentioned above, a problem may arise with the gasification reaction. The gasification requires a rather high temperature. As previously described, usually a gasification temperature of 1000° C.-1500° C. is required for a gasification process, but the distinguishing feature of a CO$_2$ recovery type gasification system according to the so-called HyPr-RING process is that the co-existing CaO is not merely a CO$_2$ absorbent but also provides an advantageous effect of promoting gasification (catalytic effect); thus, adequate gasification may be performed at relatively low temperature of around 650° C. However, it was verified that the reaction becomes extremely slow as the temperature is lowered below 650° C., which is not compatible with the relaxed hydration conditions described above.

Luckily, it was ascertained that reacting Ca(OH)$_2$, which is produced by hydration of CaO, with CO$_2$ is not essential for obtaining a beneficial effect of preventing lowered activity during repeated use of CaO and that the beneficial effect is due to change of the crystalline structure of CaO particles that occurs with the hydration. While the calcination of CaO at a high temperature like 900° C. brings about bake-compacting of CaO, it was found out that in the dehydration through heating, at around 650° C., of Ca(OH)$_2$ produced by the hydration brings about only removal of the moisture, no bake-compacting of CaO and that this is condition for high activity being preserved. It was therefore clarified that there is no necessity of simultaneously performing the hydration of CaO and the gasification reaction and that separation of the hydration and gasification processes is possible.

As shown in FIG. 1, the gasification reactor 2 arranged separately from the hydration tower 1 comprises an upper water removal section 2a and a lower gasification section 2b.

The upper water removal section 2a is supplied with absorbent hydrate Ca(OH)$_2$ by overflow from the hydration tower 1 via an L-shaped seal S. The water removal section 2a is maintained at temperature and pressure conditions for decomposition of Ca(OH)$_2$ into CaO and H$_2$O, so that all or a portion of Ca(OH)$_2$ is dehydrated into highly active absorbent CaO according to Equation 2 below:

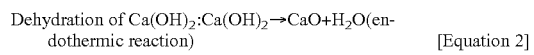

Dehydration of Ca(OH)$_2$:Ca(OH)$_2$→CaO+H$_2$O(endothermic reaction)  [Equation 2]

The above-mentioned dehydration may be carried out at a low temperature as compared with calcination, so that the CO$_2$ absorbent becomes not bake-compacted, but highly active still in a porous state. The highly active absorbent CaO is supplied by overflows just by an amount corresponding to the supplied amount of Ca(OH)$_2$ into the lower gasification section 2b via the L-shaped seal S by gravity feed, utilizing the difference in elevation.

The lower gasification section 2b has the raw material supplied by the raw material supply line 5. The high-temperature water vapor is supplied via a bottom of the gasification section by the water vapor supply line 6 so that gasification of the raw material is performed where the raw material is thermally decomposed into char which is gasified into CO and $H_2$.

The raw material supply line 5 shown in FIG. 1 is a pressurized one with two-stage vessels 5a and 5b just like the $CO_2$ absorbent supply line 4. Alternatively, three-stage vessels may be employed if the apparatus is large-scale and the operation is to be performed continuously over a long period of time. In the illustration, the screw feeder 5c is shown as feeding means; it may be sometimes difficult to transfer the raw material by the screw feeder depending upon nature of raw material. In such a case, gas-flow transfer or gravity feed may be employed.

In addition to the water vapor, the bottom of the gasification section 2b is supplied with the $CO_2$-prevailing circulation gas (including water vapor) from the absorbent regeneration tower 3 by the circulation gas supply line 7 with heat being supplied thereto by the heat exchanger 7b. In the gasification section 2b, $CO_2$ is absorbed by CaO to produce the absorptive-reaction product $CaCO_3$, the reaction heat at this time being utilized as part of heat source for the gasification of the raw material. It should be understood that no reaction of CaO with water vapor proceeds since the temperature condition is higher than the equilibrium curve temperature for the reaction (i.e. its upper limit temperature).

In the lower gasification section 2b, the reactions shown below in Equations 3 through 6 occur.

Thermal decomposition of raw material to be gasified:
$C_xH_yO_z \rightarrow C$+volatile portions(endothermic reaction)       [Equation 3]

Gasification $C+H_2O \rightarrow CO+H_2$(endothermic reaction)     [Equation 4]

Water gas shift reaction: $CO+H_2O \rightarrow CO_2+H_2$(exothermic reaction)     [Equation 5]

$CO_2$ absorption reaction: $CaO+CO_2 \rightarrow CaCO_3$(exothermic reaction)     [Equation 6]

Here it is supposed that the raw material to be gasified $C_xH_yO_z$ is coal or biomass, which is a compound of C, H and O. The raw material to be gasified may contain N, S and the like.

Endotherm of Equations 3 and 4 mentioned in the above is supplemented by the exothermic heat of Equations 5 and 6. Moreover, for promotion of the reaction of Equation 6 to supplement heat for the gasification, a portion of the $CO_2$-prevailing circulation gas from the absorbent regeneration tower 3 or the like is supplied to the gasification reactor 2.

Reaction conditions of the gasification reactor 2 are set as follows:
Temperature: around 650° C.
Pressure: 0.4 MPa±0.1 MPa (absolute pressure)

Here, in sum total with the water vapor in the circulation gas, the water vapor supplied is set to be equal to or slightly greater than an equivalent in connection with the carbon C in the raw material.

The hydrogen-prevailing gasified gas produced by gasification in the gasification reactor 2 is supplied to a dust collector 9a in the gasified gas extraction line 9 comprising a cyclone or the like, so that fine particles entrained are removed. Though the single dust collector 9a is shown in FIG. 1, a plurality of dust collectors may be arranged in several stages in consideration of dust removal performance. The gasified gas having passed through the dust collector 9a is cooled by a cooler 9b for condensation of the moisture therein and is forwarded to a purification process for separation of the hydrogen and so on. The fine powder or particles recovered are brought down to atmospheric pressure by a lock hopper mechanism 9c or the like and is discharged.

A mixture of the produced absorptive-reaction product $CaCO_3$ with char is supplied by overflow from the gasification section 2b of the gasification reactor 2 by gravity feed to a transfer pot 11 constituting a gas-flow transfer unit 14. The transfer pot 11 is supplied, through a bottom thereof, with $CO_2$-prevailing circulation gas which includes the water vapor and which is pressurized by a blower 7a in the circulation gas supply line 7, so that the particles of absorptive-reaction product $CaCO_3$ and char are vertically gas-flow transferred by the circulation gas ($CO_2$) up to a solid separation pot 12 installed at a highest position.

The solid separation pot 12 is a vessel for separation of the particles gas-flow transferred from the transfer pot 11 and the circulation gas ($CO_2$). The solid separation pot 12 has an inner diameter substantially greater than that of the transfer pot so the gas flow speed is dropped into a range suitable for formation of a fluidized bed. A portion of the solid separation pot 12 where the inner diameter is widened out is provided with a perforated plate (not shown) for prevention of the flow from the transfer pot 11 from being blown straight upward due to inertia, the perforated plate also serving to stabilize the fluidized bed in the solid separation pot 12. Overflow pipes 13a and 13b are provided at an upper portion of the fluidized bed, so that the overflowing $CaCO_3$ including char is forwarded by gravity feed, using the difference in elevation, to the absorbent regeneration tower 3 for calcination. The circulation gas ($CO_2$) separated in the solid separation pot 12 is returned to an inlet side of the blower 7a in the circulation gas supply line 7.

The calcination of the absorptive-reaction product $CaCO_3$ in the absorbent regeneration tower 3 is affected by the $CO_2$ partial pressure. For calcination at atmospheric pressure, when the $CO_2$ concentration is low, in other words when the $CO_2$ partial pressure is lower than atmospheric pressure, the reaction proceeds even at a relatively low temperature of 900° C. or less. However, in an ambient atmosphere of 100% $CO_2$, even at an atmospheric pressure, the calcination requires theoretically a temperature around 920° C. and actually a temperature in excess of 1000° C., and in pressurized condition of more than atmospheric pressure yet higher temperatures are required, disadvantageously resulting in lowering of activity due to bake-compacting. Here, it is the $CO_2$ partial pressure that affects the calcination temperature, and conversely, if the $CO_2$ partial pressure is less than one atmosphere, the process proceeds well. This means that calcination may proceed even under more or less pressurized condition by lowering the $CO_2$ partial pressure through dilution with other gas component. Use of, for example, nitrogen as the other gas component is undesirable since separation thereof from $CO_2$ is difficult to carry out. The other gas component is to be easily separatable from $CO_2$. Water vapor is considered to be appropriate as gas component since it can be easily separated and a large quantity of water vapor is also used in the gasification.

For example, in the case of performing calcination at an absolute pressure of 0.4 MPa (at a gauge pressure of 0.3 MPa), if the gas composition in the absorbent regeneration tower 3 is $CO_2$:$H_2O$=1:3 at most, in other words if the concentration of $CO_2$ is 25% or less, it becomes possible to perform calcination even under pressurized condition, though a large amount of water vapor is required. From the equilibrium curve shown in FIG. 2, theoretically, calcination proceeds at a $CO_2$ partial pressure of one atmosphere; however, it was experimentally ascertained that, since the calcination is affected by local temperature variations and the like accompanying the calcination reaction, the reaction does not proceed smoothly unless the $CO_2$ partial pressure is made lower than that derived from the relationship between $CO_2$ partial pressure and temperature shown by the equilibrium curve. Thus, in an actual process, it is appropriate to lower the $CO_2$ partial pressure by some way such as increasing the proportion of $H_2O$ above the ratio mentioned above or lowering the pressure condition for the reaction.

Thus, the absorbent regeneration tower 3 is built as a two-stage fluidized bed reaction furnace in a similar manner to the gasification reactor 2. The upper chamber 3a is supplied with the mixture of the absorptive-reaction product $CaCO_3$ with unreacted char transferred by the overflow pipe 13a from the solid separation pot 12 via an L-shaped seal S. The lower chamber 3b is supplied with the particles overflowing from the upper chamber 3a via an L-shaped seal S.

The lower chamber 3b is supplied, through a bottom thereof, with $CO_2$-prevailing circulation gas from the circulation gas supply line 7 with heat applied thereto by the heat exchanger 7c, and is further supplied with water vapor and oxygen $O_2$ by the water vapor supply line 6 and the oxygen supply line 8, respectively. Ratios of these components are set such that the $CO_2$ partial pressure in terms of absolute pressure does not exceed 0.1 MPa (one atmosphere) while the amount of $O_2$ is made appropriate for burn-up of the unreacted char, the amount of $O_2$ being adjusted while inspecting the gas composition since lack of $O_2$ would bring about a reaction of the unreacted char with water vapor or $CO_2$ to produce CO and $H_2$ and too much $O_2$ would bring about $O_2$ remaining in the regenerated gas.

The absorptive-reaction product from the gasification reactor 2 includes $CaCO_3$ and CaO at some ratio depending on the state of the reaction in the gasification reactor 2. There is also a possibility that the product has admixture of $Ca(OH)_2$ which reaches the absorbent regeneration tower 3 without being decomposed in the gasification reactor 2. The reactions are substantially the same both in the upper and lower chambers 3a and 3b of the absorbent regeneration tower 3. These two stages are set up for the purpose of promoting the decomposition of $CaCO_3$; the calcination reaction (the decomposition of $CaCO_3$ into CaO and $CO_2$) is principally performed in the upper chamber 3a while the combustion of the unreacted char is principally performed in the lower chamber 3b.

Reactions shown below are performed in the upper and lower chambers 3a and 3b:

Reactions in the upper chamber 3a:

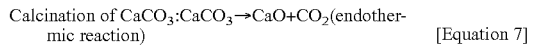
Calcination of $CaCO_3$: $CaCO_3 \rightarrow CaO+CO_2$ (endothermic reaction) [Equation 7]

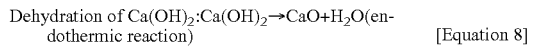
Dehydration of $Ca(OH)_2$: $Ca(OH)_2 \rightarrow CaO+H_2O$ (endothermic reaction) [Equation 8]

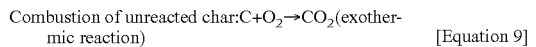
Combustion of unreacted char: $C+O_2 \rightarrow CO_2$ (exothermic reaction) [Equation 9]

Since high-temperature gas rises from the lower chamber 3b to the upper chamber 3a, the reaction of Equation 9 will suffice to an extent that it supplements heat for the endothermic reactions of Equations 7 and 8. The reaction of Equation 8 is to decompose the remaining $Ca(OH)_2$ that has not been decomposed in the gasification reactor 2 and is quantitatively small.

Reactions in the lower chamber 3b:

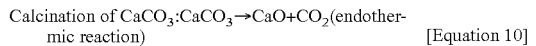
Calcination of $CaCO_3$: $CaCO_3 \rightarrow CaO+CO_2$ (endothermic reaction) [Equation 10]

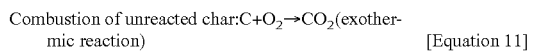
Combustion of unreacted char: $C+O_2 \rightarrow CO_2$ (exothermic reaction) [Equation 11]

Here, the reaction of Equation 10 proceeds if there is some $CaCO_3$ which has not been decomposed in the upper chamber 3a, the amount of $CaCO_3$ decomposed in the lower chamber 3b being different depending on operational conditions. Since the gas supplied through the bottom of the lower chamber 3b is lower in temperature than the operating temperature of the absorbent regeneration tower 3, the internal temperature is kept at a required level by the reaction of Equation 11 and the amount of heat required is supplemented by the reaction of Equation 10. If the amount of unreacted char is insufficient to supply such required amount of heat, it may be coped with by supplying a mixture of $CaCO_3$ with unreacted char from the solid separation pot 12 via the overflow pipe 13b to the lower chamber 3b as well.

Since the calcination which is an endothermic reaction must be balanced with the combustion of char which is an exothermic reaction, the above-mentioned adjustment is performed while monitoring the progress of the temperature.

The reaction conditions for the absorbent regeneration tower 3 described above are set as follows:
Temperature: 900° C.-1000° C.
Pressure: 0.4 MPa±0.1 MPa (absolute pressure)

The $CO_2$-prevailing gas from the absorbent regeneration tower 3 is supplied to a dust collector 7d comprising a cyclone or the like, which removes the fine particles contained therein. While in FIG. 1 the single dust collector 7d is shown, actually, such dust collectors may be installed in plural stages in consideration of dust removal performance. The $CO_2$-prevailing gas having passed through the dust collector 7d is forwarded to the circulation gas supply line 7 together with the water-vapor-prevailing gas from the hydration tower 1, and the fine powder recovered is reduced to atmospheric pressure by a lock hopper mechanism 7e and is discharged.

The regenerated $CO_2$ absorbent overflowing from the lower chamber 3b is forwarded to the hydration tower 1 by gravity feed, utilizing their difference in elevation. It should be understood that, in a similar manner to that described above in reference to the $CO_2$ absorbent supply line 4 for preventing elevation in concentration of the ash percentage, a portion of the ash percentage may be extracted in branched manner together with CaO through an overflow pipe provided to the lower chamber 3b of the absorbent regeneration tower 3 or a line for direct discharge from the lower chamber 3b may be provided to discharge a portion of the ash percentage together with CaO.

The circulation gas in the circulation gas supply line 7 is high in concentration, being almost 100% $CO_2$ when the water vapor $H_2O$ is eliminated, so that $CO_2$ may be recovered by extracting a portion of the circulation gas from the $CO_2$ recovery line 10 and by condensing the water vapor therein. The recovered $CO_2$ may be isolated by any required way.

Mode of operation of the above embodiment will be described.

Figure 2:
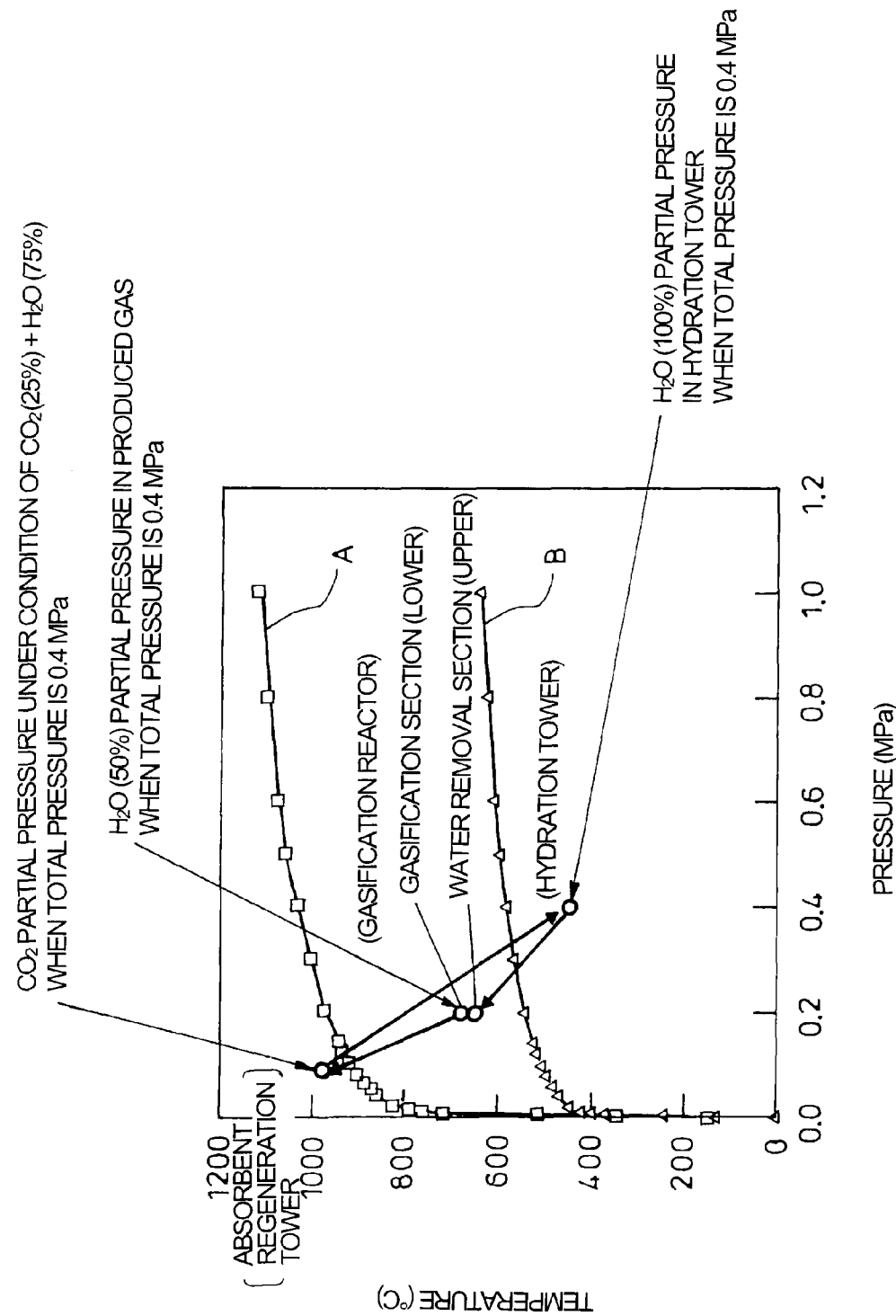
FIG. 2 is a reaction curve diagram showing a relationship between pressure and temperature in a hydration tower, a gasification reactor and an absorbent regeneration tower according to the invention.

FIG. 2 plots a reaction curve showing a relationship between pressure and temperature in the hydration tower 1, gasification reactor 2 and absorbent regeneration tower 3 in the embodiment of FIG. 1. In FIG. 2, reference character A denotes a reaction equilibrium diagram for $CaO+CO_2 \leftrightarrow CaCO_3$ where sides above and blow the line A represent decomposition and coupling, respectively; and reference character B denotes a reaction equilibrium diagram for $CaO+H_2O \leftrightarrow Ca(OH)_2$ where sides above and below the line B represent decomposition and coupling, respectively.

The hydration tower 1 is supplied with CaO regenerated in the absorbent regeneration tower 3 and added CaO from the $CO_2$ absorbent supply line 4 and is further supplied, through a bottom of the tower, with high-temperature water vapor from the water vapor supply line 6 to thereby produce absorbent hydrate $Ca(OH)_2$ through the reaction. $Ca(OH)_2$ is produced from CaO in stabilized hydration reaction since a temperature range of 500° C.±50° C. is selected which is at or below the upper limit temperature for production of $Ca(OH)_2$ by contact of CaO with water vapor in the hydration tower 1 and the pressure in the hydration tower 1 is set to 0.4 MPa±0.1 MPa (absolute pressure).

$Ca(OH)_2$ produced in the hydration tower 1 is supplied by overflow to the upper water removal section 2a of the gasification reactor 2. The water removal section 2a is set to a temperature around 650° C., which is the temperature for decomposition of $Ca(OH)_2$ into CaO and $H_2O$, and is set to a pressure of 0.4 MPa±0.1 MPa (absolute pressure), so that, if the water vapor concentration is around 50%, the water vapor partial pressure becomes around 0.2 MPa (absolute pressure) and some or all of $Ca(OH)_2$ is dehydrated into highly active $CO_2$ absorbent CaO which is not bake-compacted but remains in the porous state. The highly active absorbent CaO is forwarded by overflow to the lower gasification section 2b.

The lower gasification section 2b is supplied with the raw material and is further supplied with the water vapor through the bottom thereof so as to gasify the raw material, so that the raw material is thermally decomposed into char and is gasified into CO and $H_2$.

In addition to the water vapor, the gasification section 2b is supplied with $CO_2$-prevailing circulation gas, so that $CO_2$ is absorbed by CaO to produce the absorptive-reaction product $CaCO_3$, the heat of reaction at this time being utilized as a portion of the heat source for the gasification process. Since the temperature is high, no reaction of CaO with water vapor takes place.

In the gasification reactor 2 described above, the raw material is gasified with the water vapor and $CO_2$ is effectively absorbed by the highly active absorbent CaO, so that the $H_2$-prevailing gasified gas is effectively taken out from the gasification reactor 2.

The mixture of the absorptive-reaction product $CaCO_3$ with char produced in the gasification section 2b of the gasification reactor 2 is dropped by overflow into the transfer pot 11 constituting the gas flow transfer unit 14 and is gas-flow transferred by the $CO_2$- and water-vapor-prevailing circulation gas into the solid separation pot 12 where the circulation gas is separated out and the mixture of the absorptive-reaction product $CaCO_3$ with char is supplied to the absorbent regeneration tower 3.

The absorbent regeneration tower 3 is set to 900° C.-1000° C. and is set to 0.4 MPa±0.1 MPa (absolute pressure), and, if the water vapor concentration is around 75% (the $CO_2$ concentration will be around 25% since $CO_2$ is the majority of the remainder), then the $CO_2$ partial pressure is around 0.1 MPa (absolute pressure). The absorptive-reaction product $CaCO_3$ supplied to the upper chamber 3a is made free from $CO_2$ principally by the calcination reaction (in which $CaCO_3$ is decomposed into CaO and $CO_2$) into highly active CaO which is supplied to the lower chamber 3b. In the lower chamber 3b, combustion of the char is principally performed for supply of heat required for the calcination reaction.

The $CO_2$-prevailing gas from the absorbent regeneration tower 3 is supplied to the dust collector 7d comprising a cyclone or the like, so that it is made free from fine particles entrained and is fed to the circulation gas supply line 7.

A portion of the circulation gas in the circulation gas supply line 7, which comprises $CO_2$ with high concentration at nearly 100% when the water vapor $H_2O$ is removed, is extracted by the $CO_2$ recovery line 10 and the water vapor included therein is condensed to recover $CO_2$ for isolation.

Also as shown in FIG. 2, the relaxed temperature condition in the hydration tower 1 for pressure elevation, substantial pressure reduction in the gasification reactor 2 for enabled gasification and lowering of $CO_2$ partial pressure in the absorbent regeneration tower 3 for enabled calcination make it possible to perform hydration, gasification and calcination at the same low pressure of 0.4 MPa±0.1 MPa (absolute pressure) close to atmospheric pressure throughout the system. As a result, advantageously, the apparatus can be substantially simplified in structure since pressure elevation and lowering devices can be omitted which are provided for transfer of $CO_2$ absorbent and the like between a gasification reactor and a absorbent regeneration tower maintained in the prior art at different pressures; an efficient continuous operation can be made at the same pressure; and handling and control of the apparatus become simplified since the operation is performed at a low pressure close to atmospheric pressure.

Figure 3:
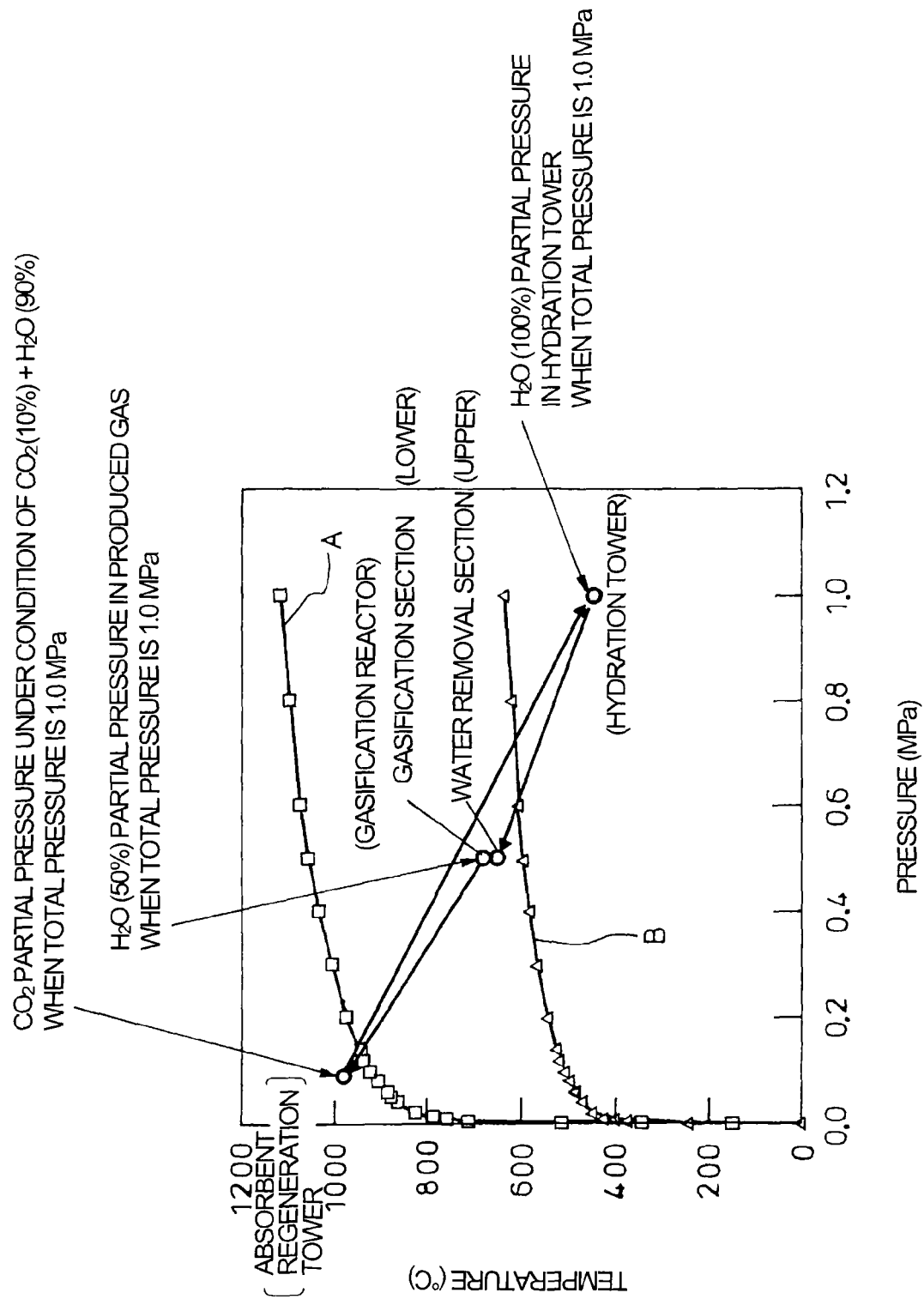
FIG. 3 is a reaction curve diagram for explanation of possible expansion in range of pressure and temperature in the hydration tower, the gasification reactor and the absorbent regeneration tower according to the invention.

In reference to the system in the above embodiment, the overall pressure is set to 0.4 MPa±0.1 MPa (absolute pressure). The inventors made intensive investigations on a possibility of further widening the pressure range in the overall system and succeeded in widening the pressure range of the entire system in the above-mentioned embodiment to 0.1 Pa-1.0 Pa (absolute pressure)

as shown in FIG. 3.

Widening the Pressure Range Towards the Low Pressure Side:

To lower the pressure is a task to be solved with respect to the hydration tower 1; in the above embodiment, the lower limit value of the pressure is made to be 0.4 MPa (absolute pressure) by limiting the temperature in the hydration tower 1 to 450° C.-550° C. By dropping the temperature of the hydration tower 1 to 400° C., it becomes possible to widen the pressure range condition as low as atmospheric pressure (0.1 MPa). There is no problem in setting the temperature of the hydration process to 400° C. By dropping the pressure, the design of the apparatus for withstanding pressure becomes easy while the size of the reactor and so on becomes great. Therefore, with a small scale apparatus, it is more advantageous to select low pressure condition while, with a large scale apparatus, it is more advantageous to select high pressure condition.

Widening the Pressure Range Towards the Low Pressure Side:

When the pressure is raised, the $CO_2$ partial pressure in the absorbent regeneration tower 3 becomes higher and the necessity arises to raise the temperature of regeneration. However this is not desirable since decrease in activity of the $CO_2$ absorbent (CaO) may take place upon regeneration. Thus, it is necessary to lower the $CO_2$ partial pressure at or below atmospheric pressure, which arises a problem that a large amount of water vapor is required for dilution.

However, the problem of required increase of water vapor for dilution is expected to be solved by improvement described hereinafter, so that it becomes possible to widen the pressure range towards the high pressure side (1.0 MPa).

With regard to the calcination in the absorbent regeneration tower 3, it has been understood that, with the $CO_2$ partial pressure exceeding 0.1 MPa (absolute pressure, i.e. atmospheric pressure), the regeneration reaction does not proceed unless the temperature is raised to greatly exceed 1000° C. Conversely, even if the total pressure is greater than atmospheric pressure, if the $CO_2$ partial pressure is at or below 0.1 MPa (absolute pressure), the temperature at which regeneration can proceed tends to lower as the $CO_2$ partial pressure becomes lower. For example, if the $CO_2$ partial pressure is set to be 0.1 MPa (absolute pressure), then at a total pressure of 0.4 MPa (absolute pressure), the $CO_2$ concentration in the regeneration gas becomes 25% (with water vapor being 75%). It is desirable for the $CO_2$ concentration in the regeneration gas to be 20% or less since the more below 0.1 MPa the $CO_2$ partial pressure is, the lower the regeneration temperature can be set. Even in the above-mentioned widened pressure range (absolute pressure 0.1 MPa-1.0 MPa), the $CO_2$ partial pressure can be suppressed below atmospheric pressure by adjusting the $CO_2$ concentration, which however requires in practice a large amount of water vapor for dilution. In the flow of the system shown, the outlet gas in the absorbent regeneration tower 3 is utilized in a circulated manner. As a result, provided that condensation of the water vapor shall not occur during the gas compression process, the above-mentioned widening of the pressure range becomes possible since water vapor to be supplied is in an extremely limited amount due to the fact that the water vapor can be used in a circulated manner.

Thus, adjustment of the water vapor partial pressure in the hydration tower 1, of the water vapor partial pressure in the gasification reactor 2 and of the $CO_2$ partial pressure in the absorbent regeneration tower 3 makes it possible to set the total pressure throughout the system of FIG. 1 to a desired pressure within the range of 0.1 MPa-1.0 MPa (absolute pressure). Thus, the operating conditions of the apparatus for gasification can be set over a broad range.

The reaction temperature of the gasification reactor 2 in the above embodiment is set to 650° C. It was found out that the reaction temperature can be widened into a range of 600° C.-700° C.

The Reason for Widening the Range:

In the above embodiment, the reaction temperature of the gasification reactor 2 is set to 650° C. This is because at temperatures lower than 650° C. the gasification reaction is difficult to proceed. On the other hand, the prior art has a problem that the $CO_2$ absorbent may melt during gasification at a temperature higher than 650° C.; in consideration of this in the above embodiment as well, temperatures higher than 650° C. are avoided. Specifically, since the hydration of the $CO_2$ absorbent and the absorption of $CO_2$ take place within the same reactor in the prior art, in addition to CaO, $Ca(OH)_2$ and $CaCO_3$ as respective reaction products co-exist, so that the melting point of the absorptive-reaction product or a mixture of CaO, $Ca(OH)_2$ and $CaCO_3$ is lowered close to the gasification temperature. As a result, the absorptive-reaction product may melt with only a slight temperature increase; under the influence of such melting, troubles such as sintering and fusion of the components may occur.

However, as a result of investigations by the inventors, it was found out that, under the reaction conditions of the above embodiment, almost no $Ca(OH)_2$ may exist in the gasification section 2b and therefore the absorptive-reaction product does not melt over a range somewhat exceeding 650° C. With this process, the heat generated upon absorption of $CO_2$ by the $CO_2$ absorbent is utilized as heat for gasification of coal so that high heating exceeding 700° C. cannot be expected. Thus, the upper limit is set at 700° C. As to the low temperature side set not to be less than 650° C. due to the fear that the gasification reaction may become difficult to proceed, it was found out that with a raw material having higher reactivity, temperature lowering to some extent is permitted. Accordingly, the low temperature side is extended as far as 600° C.

In the above embodiment, the absorbent regeneration tower 3 is arranged in the highest position, and by taking advantage of difference in elevation for gravity feeding, the $CO_2$ absorbent regenerated is supplied to the hydration tower 1 by its own weight and similarly the $CO_2$ absorbent hydrated is supplied to the gasification reactor 2 by its own weight. The mixture of the absorptive-reaction product $CaCO_3$ with char produced in the gasification reactor 2 is gas-flow transferred to the absorbent regeneration tower 3. Arrangements of the various devices in the system may be variously changed.

Figure 4:
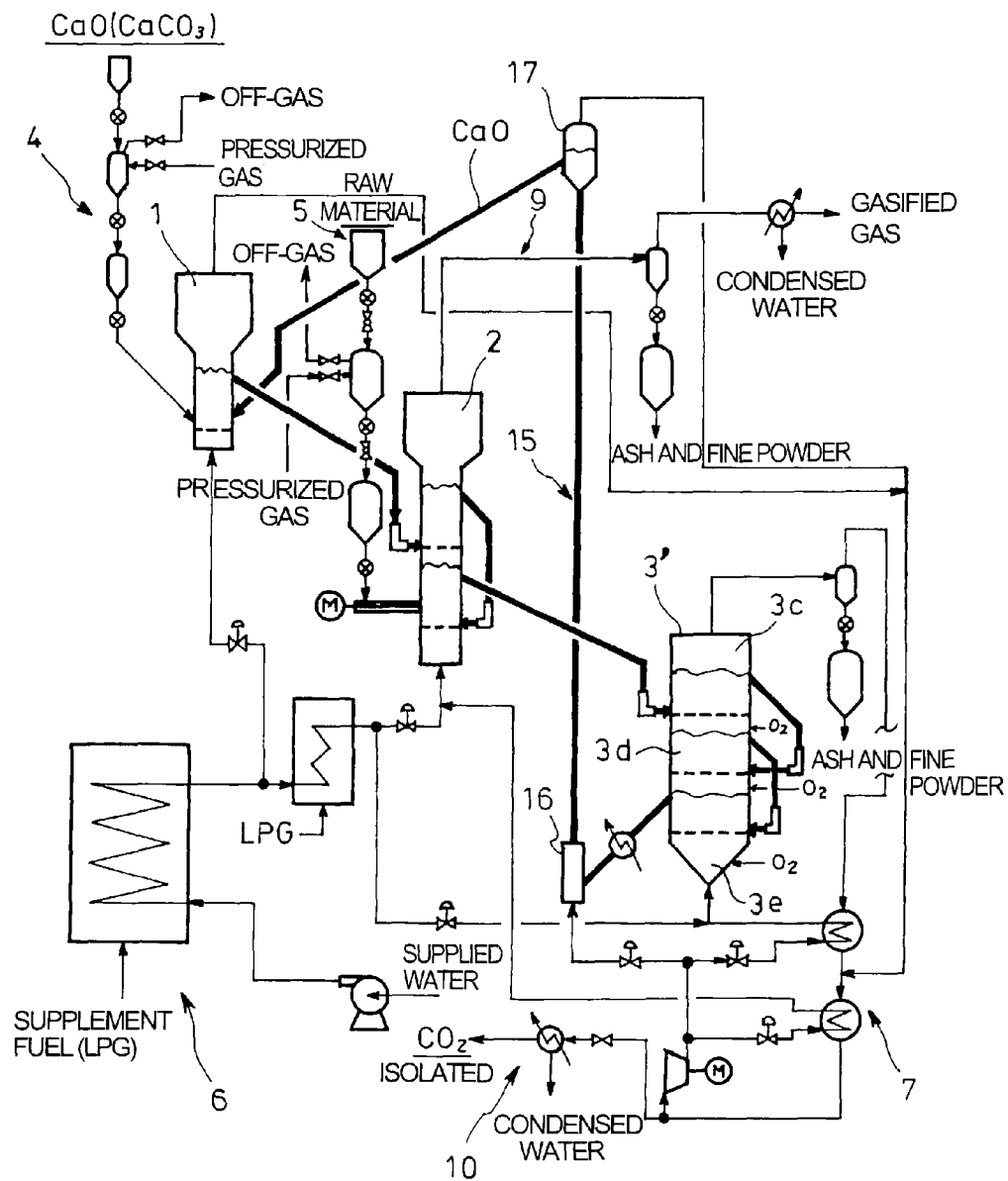
FIG. 4 is a flow sheet showing a further embodiment of an apparatus for gasification according to the invention.

FIG. 4 is a flow sheet showing a further embodiment of an apparatus for gasification according to the invention in which a structure shown is more practical than that of the embodiment of FIG. 1. In FIG. 4, the $CO_2$ absorbent supply line 4 and the raw material supply line 5 are pressurized lines each with three stage vessels.

With the embodiment of FIG. 4, an absorbent regeneration tower 3' and a hydration tower 1 are arranged at the lowest and highest positions in a system, respectively. Accordingly, $Ca(OH)_2$ from the hydration tower 1 is supplied to a gasification reactor 2 due to its own weight; a mixture of absorptive-reaction product $CaCO_3$ with char from the gasification reactor 2 is supplied to the absorbent regeneration tower 3' by gravity feed under its own weight; and a $CO_2$ absorbent (CaO) regenerated in the absorbent regeneration tower 3' is transferred by overflow and by gravity feed to a transfer pot 16 constituting transfer means 15. The $CO_2$ absorbent (CaO) gravity fed into the transfer pot 16 is gas-flow transferred by a $CO_2$- and water-vapor-prevailing circulation gas to a solid separation pot 17 where CaO is separated from the circulation gas and is supplied to the hydration tower 1, the separated circulation gas being supplied to a circulation gas supply line 7.

By contrast to the absorbent regeneration tower 3 in the embodiment of FIG. 1 being of a two stage type, the absorbent regeneration tower 3' in the embodiment of FIG. 4 is of a three stage type, appropriate type being suitably selectable depending on raw material used such as coal or limestone. The absorbent regeneration tower 3' shown in FIG. 4 includes an upper preheating chamber 3c which is supplied with the absorptive-reaction product $CaCO_3$ including char by gravity feed from a gasification section 2b of the gasification reactor 2 so as to preheat the absorptive-reaction product; an intermediate stage reaction chamber 3d which receives the absorptive-reaction product including char from the preheating chamber 3c to calcine the absorptive-reaction product due to heat of combustion of the char so as to separate the same into $CO_2$ and $CO_2$ absorbent; and a lower heat exchange chamber 3e which receives the $CO_2$ absorbent from the reaction chamber 3d and heats the circulation gas by contact with the $CO_2$ absorbent.

In the embodiment of FIG. 1, the gas-flow transfer unit having an inactive atmosphere is interposed between the gasification reactor 2 and the absorbent regeneration tower 3, which brings about an advantageous effect of preventing the reducing atmosphere of the gasification reactor 2 and the oxidizing atmosphere of the absorbent regeneration tower 3 from being mixed with each other.

On the other hand, the embodiment of FIG. 4 has no device between the gasification reactor 2 and the absorbent regeneration tower 3' for clear separation of their atmospheres. However, this possesses an advantage that heating up to the temperature condition for regeneration is easy to perform since the absorptive-reaction product CaCO heated in the gasification reactor 2 reaches the absorbent regeneration tower 3' almost without having been cooled at all. In order to prevent mixture of the gases in the reducing atmosphere and the oxidizing atmosphere in the embodiment of FIG. 4, attention is to be paid to the pressure balance between the gasification reactor 2 and the absorbent regeneration tower 3', which may be coped with by the control system.

Figure 5:
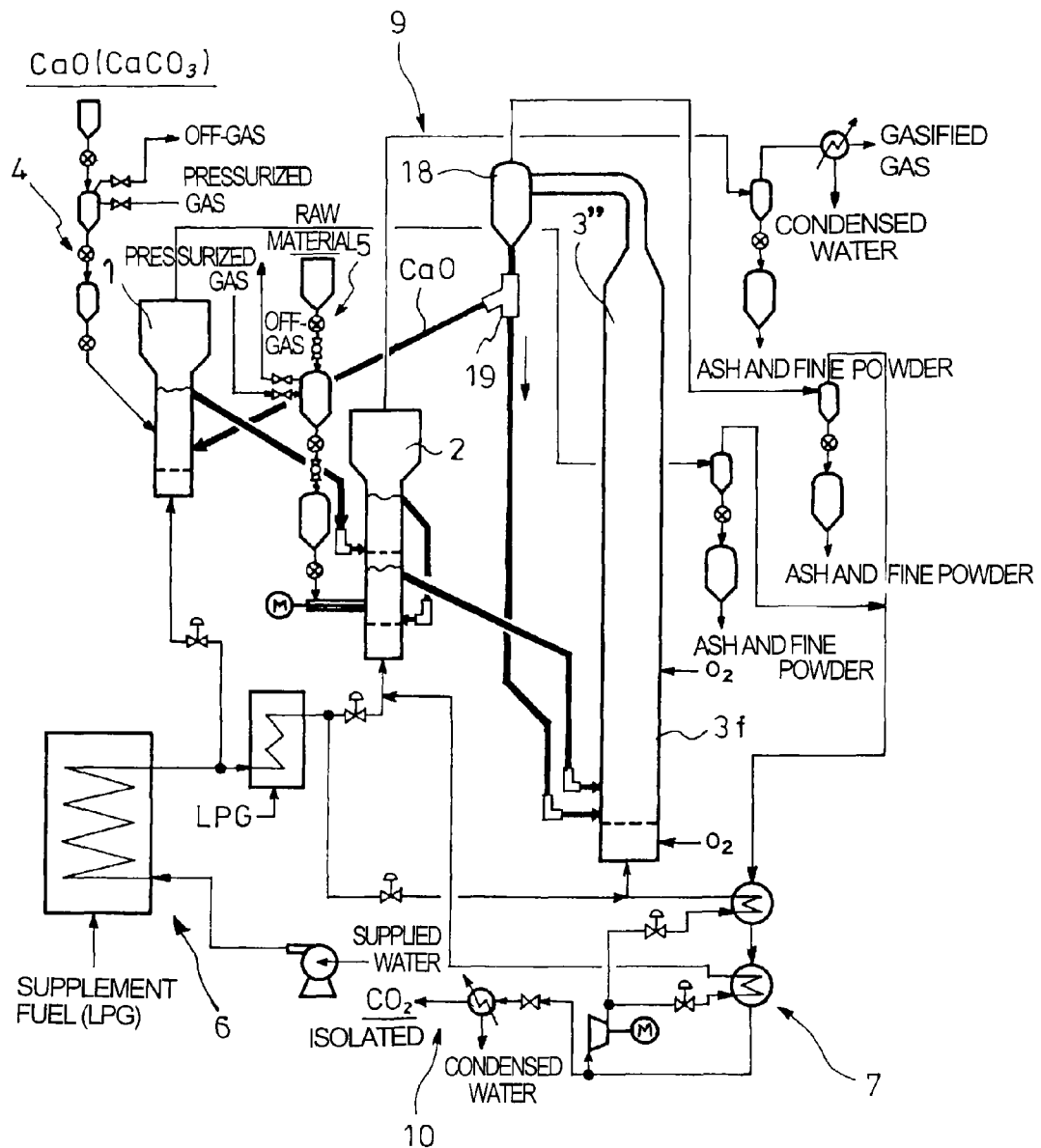
FIG. 5 is a flow sheet showing a still further embodiment of an apparatus for gasification according to the invention.

FIG. 5 is a flow sheet showing a still further embodiment of an apparatus for gasification according to the invention. In the apparatus of FIG. 5, an absorbent regeneration tower 3" comprises a blowing-up regeneration tower 3f which is supplied, at a lower end thereof, with an absorptive-reaction product including char from a gasification section 2b of a gasification reactor 2 by gravity feed, the absorptive-reaction product being subjected to a calcination reaction due to heat of combustion of the char to be separated into $CO_2$ and $CO_2$ absorbent while being blown up in an interior of the tower 3" by a circulation gas. The blowing-up regeneration tower 3f is connected at its upper end to a solid separation pot 18 with distribution means 19 which is adapted to supply a portion of CaO separated by the solid separation pot 18 to the hydration tower 1 by gravity feed and to circulate the remainder of CaO to the lower end of the blowing-up regeneration tower 3f.

The blowing-up regeneration tower 3f serving also as transfer means for supplying CaO to the hydration tower 1 as shown in FIG. 5 is advantageous in that the system can be made simple in comparison with the system shown in FIG. 4 and that transfer gas for gas-flow transfer becomes unnecessary.

The absorptive-reaction product $CaCO_3$ may be insufficiently regenerated since the solid particles pass together with the gas through the interior of the regeneration tower 3f in a rather short period of time. In order to overcome this, a portion of CaO from the blowing-up regeneration tower 3f and separated in the solid separation pot 17 is circulated through the distribution means 19 back to the bottom end of the regeneration tower 3f, so that a sufficient time for regeneration is assured due to passing of CaO through the blowing-up regeneration tower 3f several times. The amount of recirculation may be adjusted as desired by the distribution means 19.

It is to be understood that the present invention is not limited to the above embodiments and that various changes and modification may be made without departing from the scope of the invention.

INDUSTRIAL APPLICABILITY

A method and an apparatus for gasification with $CO_2$ recovery according to the invention is applicable for enabling efficient and continuous operation all at the same pressure and enabling simplified handling and control of the apparatus at an operation under a relatively low pressure.

The invention claimed is:

1. A method for gasification with $CO_2$ recovery, comprising:
a hydration process for performing a hydration reaction by contact of a $CO_2$ absorbent with water vapor while keeping a predetermined pressure and maintaining a temperature at or below an upper limit for production of an absorbent hydrate;
a water removal process in which the absorbent hydrate produced by the hydration process is introduced to be heated for water removal, thereby obtaining a highly active absorbent;
a gasification process for producing char through reaction of a raw material with water vapor and for gasifying the char to produce a gasified gas, $CO_2$ being absorbed by said highly active absorbent from said water removal process to produce an absorptive-reaction product, heat of the reaction at this time being utilized for gasification of said raw material, said gasified gas being passed through said water removal process for supply of a heat source for water removal from the absorbent hydrate;
an absorbent regeneration process in which, in the presence of the absorptive-reaction product including the char from said gasification process, a circulation gas including $CO_2$ and water vapor and oxygen, the absorptive-reaction product is calcined with heat of combustion of the char for separation into $CO_2$ and $CO_2$ absorbent, a resultant $CO_2$ absorbent being supplied to said hydration process; and
a $CO_2$ recovery process for extracting and recovering a portion of $CO_2$ separated by said absorbent regeneration process and circulated to said gasification process and to said absorbent regeneration process;
pressure in said water removal process, said gasification process and said absorbent regeneration process being the same as pressure in said hydration process.

2. A method for gasification with $CO_2$ recovery according to claim 1, wherein an absolute total pressure is set to a desired pressure within a range of 0.1 MPa-1.0 MPa by controlling, among the respective processes, water vapor partial pressure in a hydration tower, water vapor partial pressure in said gasification process and $CO_2$ partial pressure in an absorbent regeneration tower to ranges suitable for corresponding reactions while adjusting a gas composition for each of the corresponding processes.

3. A method for gasification with $CO_2$ recovery according to claim 1, wherein said hydration process has a temperature of 450° C.-550° C.

4. A method for gasification with $CO_2$ recovery according to claim 1, wherein said water removal and gasification processes have a temperature of 600° C.-700° C.

5. A method for gasification with $CO_2$ recovery according to claim 1, wherein said absorbent regeneration process has a temperature of 900° C.-1000° C.

6. A method for gasification with $CO_2$ recovery according to claim 2, wherein said hydration process has a temperature of 450° C.-550° C.

7. A method for gasification with $CO_2$ recovery according to claim 2, wherein said water removal and gasification processes have a temperature of 600° C.-700° C.

8. A method for gasification with $CO_2$ recovery according to claim 2, wherein said absorbent regeneration process has a temperature of 900° C.-1000° C.

9. An apparatus for gasification with $CO_2$ recovery, comprising:
a hydration tower for performing a hydration reaction by contact of a $CO_2$ absorbent with water vapor while keeping a predetermined pressure and maintaining a temperature at or below an upper limit for production of an absorbent hydrate;
a gasification reactor comprising a water removal section in which the absorbent hydrate produced in the hydration tower is introduced to be heated for water removal, thereby obtaining a highly active absorbent, and a gasification section for producing char through reaction of a raw material with water vapor and for gasifying the char to produce a gasified gas, $CO_2$ being absorbed by said highly active absorbent from said water removal process to produce an absorptive-reaction product, heat of the reaction at this time being utilized for gasification of said raw material, said gasified gas being passed through said water removal process for supply of a heat source for water removal from the absorbent hydrate;
a gas-flow transfer unit for transferring the absorptive-reaction product including the char from the gasification section of the gasification reactor to upward;
an absorbent regeneration tower in which, in the presence of the absorptive-reaction product including the char transferred by the gas-flow transfer unit, a circulation gas including $CO_2$ and water vapor and oxygen, the absorptive-reaction product is calcined with heat of combustion of the char for separation into $CO_2$ and $CO_2$ absorbent, a resultant $CO_2$ absorbent being supplied to said hydration tower; and a $CO_2$ recovery line for extracting and recovering a portion of $CO_2$ separated by an absorbent regeneration process and circulated to a gasification process and to an absorbent regeneration process;

pressure in said gasification reactor and absorbent regeneration tower connected to said hydration tower being the same as pressure in said hydration tower.

10. An apparatus for gasification with $CO_2$ recovery according to claim 9, wherein said absorbent regeneration tower comprises an upper chamber which receives the absorptive-reaction product including char by gravity feed from said gasification section of said gasification reactor and which principally performs a calcination reaction of the absorptive-reaction product for separation of the same into $CO_2$ and $CO_2$ absorbent, and a lower chamber which receives the $CO_2$ absorbent and the char from said upper chamber and which principally performs combustion of the char.

11. An apparatus for gasification with $CO_2$ recovery according to claim 9, wherein said absorbent regeneration tower comprises an upper preheating chamber which receives the absorptive-reaction product including char by gravity feed from said gasification section of said gasification reactor to preheat said absorptive-reaction product; an intermediate reaction chamber which receives the absorptive-reaction product including the char from said preheating chamber and which performs a calcination reaction of said absorptive-reaction product for separation of the same into $CO_2$ and $CO_2$ absorbent by heat of combustion of the char; and a lower heat exchange chamber which receives the $CO_2$ absorbent from said reaction chamber and which heats a circulation gas by contact with said $CO_2$ absorbent; and further comprises transfer means which receives in a transfer pot $CO_2$ absorbent from said heat exchange chamber, transfers the $CO_2$ absorbent with the circulation gas to a solid separation pot at a highest position and supplies the $CO_2$ absorbent separated in said solid separation pot to said hydration tower by gravity feed.

12. An apparatus for gasification with $CO_2$ recovery according to claim 9, wherein said absorbent regeneration tower comprises a blowing-up regeneration tower which receives at a lower end thereof the absorptive-reaction product including char from said gasification section of said gasification reactor by gravity feed, said absorptive-reaction product being subjected to said calcination reaction by heat of combustion of the char and being separated into $CO_2$ and $CO_2$ absorbent while being blown up in an interior of the tower by the circulation gas, said blowing-up regeneration tower being connected at an upper end thereof to a solid separation pot with distribution means which is adapted to supply a portion of the $CO_2$ absorbent separated by said solid separation pot to said hydration tower by gravity feed and to circulate the remainder of said $CO_2$ absorbent to the lower end of said blowing-up regeneration tower.

* * * * *